United States Patent
Liu et al.

(10) Patent No.: US 8,365,115 B2
(45) Date of Patent: Jan. 29, 2013

(54) SYSTEM AND METHOD FOR PERFORMANCE MODELING OF INTEGRATED CIRCUITS

(75) Inventors: Louis Chao-Chiuan Liu, Hsin-Chu (TW); Morly Hsieh, Sunnyvale, CA (US); Dei-Pei Liu, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 368 days.

(21) Appl. No.: 12/630,712

(22) Filed: Dec. 3, 2009

(65) Prior Publication Data

US 2010/0229137 A1   Sep. 9, 2010

Related U.S. Application Data

(60) Provisional application No. 61/157,951, filed on Mar. 6, 2009.

(51) Int. Cl.
*G06F 17/50* (2006.01)
(52) U.S. Cl. .................. 716/108; 716/113
(58) Field of Classification Search .............. None
See application file for complete search history.

(56) References Cited

U.S. PATENT DOCUMENTS

| | | | | |
|---|---|---|---|---|
| 5,636,372 A * | 6/1997 | Hathaway et al. | ............ | 713/500 |
| 7,010,475 B2 * | 3/2006 | Ehrler | .............................. | 703/15 |
| 7,069,178 B2 | 6/2006 | Cui et al. | | |
| 7,222,319 B2 * | 5/2007 | Yonezawa | ..................... | 716/108 |
| 7,237,212 B2 * | 6/2007 | Kucukakar et al. | ........... | 716/113 |
| 7,399,648 B2 * | 7/2008 | Bzowy | ............................. | 438/14 |
| 7,480,881 B2 * | 1/2009 | Tetelbaum et al. | ........... | 716/113 |
| 2006/0253820 A1 | 11/2006 | Bzowy | | |
| 2008/0046848 A1 * | 2/2008 | Tetelbaum et al. | ............... | 716/6 |
| 2009/0217226 A1 * | 8/2009 | Cui et al. | ........................ | 716/6 |

* cited by examiner

*Primary Examiner* — Leigh Garbowski
(74) *Attorney, Agent, or Firm* — Slater & Matsil, L.L.P.

(57) ABSTRACT

A system and method for performance modeling of integrated circuits is provided. A method for performing timing analysis on an integrated circuit is provided, the integrated circuit having a timing path. The method includes computing a number of non-common timing path elements in the timing path, assigning a timing de-rate factor to the timing path based on the number of non-common timing path elements, and computing a timing analysis on the integrated circuit using the assigned timing de-rate factor.

20 Claims, 9 Drawing Sheets

| | | |
|---|---|---|
| 605 | OCV MARGIN (PS) | 50 |
| 610 | OCV % | 5.4% |
| 615 | N * SIGMA | 5.0 |
| 620 | SBOCV MARGIN (PS) | 50.0 |
| 625 | SBOCV NUMBER | 3 |
| | TECHNOLOGY | 45LP |
| | VARIATION TYPE | SSG [W/O GLOBAL VARIATION] |
| | CELL TYPE | CKBD48WP9T |
| | TRANSITION @TT | 100P |

SYSTEM AND METHOD FOR PERFORMANCE MODELING OF INTEGRATED CIRCUITS

This application claims the benefit of U.S. Provisional Patent Application Ser. No. 61/157,951, filed on Mar. 6, 2009, and entitled "System and Method for Performance Modeling of Integrated Circuits," which application is incorporated herein by reference.

TECHNICAL FIELD

The present invention relates generally to integrated circuits, and more particularly to a system and method for performance modeling of integrated circuits.

BACKGROUND

Variations such as process, voltage, temperature, IR drop, and so forth, may have an impact on an integrated circuit. In general, these variations may alter the performance of circuitry in the integrated circuit. Therefore, an integrated circuit may fail to operate properly over an entirety of possible variations, even though it is functionally correct and manufactured within tolerances.

In general, on-chip variation (OCV) is a timing-analysis methodology that may be used to analyze integrated circuit timing due to fabrication process variations on circuitry in the integrated circuit. OCV may allow circuit designers to ensure that their circuit designs will continue to meet design criteria in light of expected process variations of the fabrication process used to create the integrated circuit.

Typically, fabrication process variations may occur at different levels. Some fabrication process variations may remain relatively consistent for an entire fabrication process, while others may vary between different wafer lots but are consistent for a single lot of wafers. Other fabrication process variations may occur between wafers of a single wafer lot, and yet others may vary on a single wafer. Finally, some may occur within a single integrated circuit chip.

Examples of fabrication process variations that may occur within a single integrated circuit may include mask variations, etching variations, optical proximity variations, and so forth. Generally, many of these variations may occur over a small area, potentially impacting one portion of a circuit while not affecting another portion of the same circuit. These variations may result in problems such as, signal setup, signal hold, clock gating, and so forth.

A prior art technique commonly referred to as statistical static timing analysis (SSTA) makes use of Monte Carlo simulation techniques with a circuit simulation application, such as Spice, making use of fabrication process models to computing timing performance for an integrated circuit. Monte Carlo simulation technique may compute a range of performance numbers for the integrated circuit from process variation information provided in the fabrication process model. SSTA may consume a considerable amount of time to perform, however, since a wide range of possible process variations must be simulated.

A prior art technique commonly referred to as static timing analysis STA with OCV (STA+OCV) uses a constant timing de-rating factor that may be applied to each timing path element in a timing path of an integrated circuit, for example, each buffer in a buffer chain, to compute a minimum and a maximum timing for the timing path. The constant timing de-rating factor may be a manufacturing process dependent value. Then, a variety of possible combinations of positive and negative contributions of the timing de-rating factor on each timing path element in the timing path may be analyzed to determine the minimum and the maximum timing for the integrated circuit. If the integrated circuit meets design criteria, then the integrated circuit may be considered as having passed STA+OCV analysis. STA+OCV does not consider the number of timing path elements when it is assigning a timing de-rating factor, potentially leading to timing analysis results that are inaccurate, especially for small or large numbers of timing path elements.

SUMMARY OF THE INVENTION

These and other problems are generally solved or circumvented, and technical advantages are generally achieved, by embodiments of a system and a method for performance modeling of integrated circuits.

In accordance with an embodiment, a method for performing timing analysis on an integrated circuit, the integrated circuit having a timing path, is provided. The method includes computing a number of non-common timing path elements in the timing path, assigning a timing de-rate factor to the timing path based on the number of non-common timing path elements, and computing a timing analysis on the integrated circuit using the assigned timing de-rate factor.

In accordance with another embodiment, a method for approving an integrated circuit for fabrication, wherein the integrated circuit has at least one timing path, is provided. The method includes receiving a design for the integrated circuit, computing performance data for the integrated circuit by performing a timing analysis of each timing path in the integrated circuit, and approving the design in response to determining that the performance data meets performance requirements. Each timing path in the integrated circuit is de-rated based on a number of non-common timing path elements in the timing path.

In accordance with another embodiment, a system for performing timing analysis on a design of an integrated circuit is provided. The system includes a timing path select unit, a stage de-rate factor select unit coupled to the timing path select unit, and a stage-based on-chip variation (OCV) analysis engine coupled to the stage de-rate factor select unit. The timing path select unit selects timing paths in the design, and the stage de-rate factor select unit assigns a timing de-rate factor to each timing path selected by the timing path select unit, where a timing de-rate factor assigned to a timing path is based on a number of non-common timing path elements in the timing path. The stage-based OCV analysis engine computes timing information for the design from the timing de-rate factors assigned to each timing path in the design.

An advantage of an embodiment is that OCV data that may be made specific to each integrated circuit design depending on the number of timing path elements (stages) in timing paths of the integrated circuit. This allows for an adaptive timing analysis that may provide more accurate timing results. This may lead to integrated circuitry with increased performance, smaller die sizes, shorter design cycles, and so forth.

A further advantage of an embodiment is that changing an OCV timing de-rating factor based on a number of stages in a timing path reduces design pessimism by not over de-rating designs with a larger number of stages and increases design robustness by more accurately characterizing designs with a smaller number of stages.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 6a is a diagram of a portion of a stage-based OCV tuning table;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely an integrated circuit design tool that uses stage based OCV with statistical analysis to perform timing analysis to determine if integrated circuits fabricated using a specific 45 nanometer fabrication process meet design criteria. The invention may be applied to integrated circuits fabricated using other 45 nanometer fabrication processes, as well as fabrication processes at other feature sizes.

Figure 1:
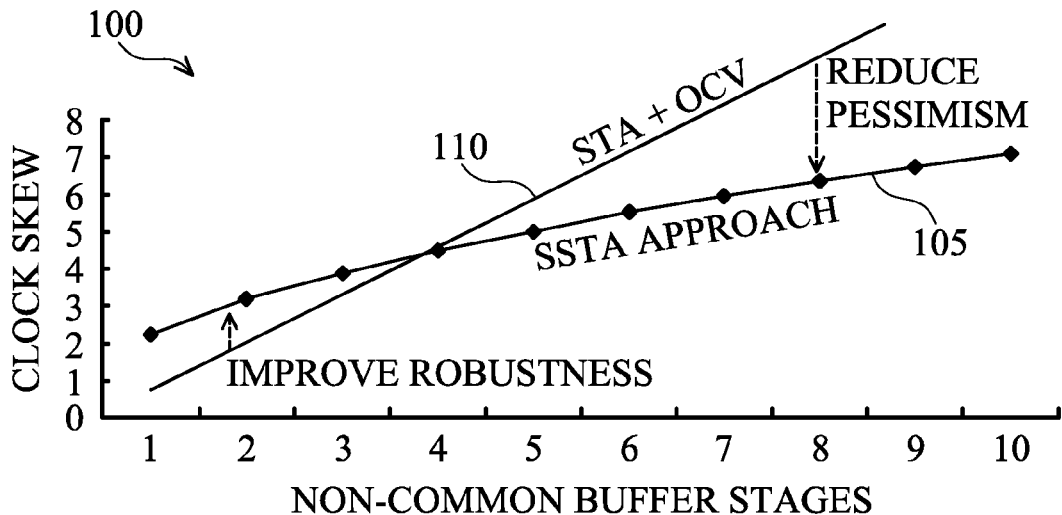
FIG. 1 is a data plot of clock skew versus number of non-common clock buffer stages.

FIG. 1 is a data plot 100 illustrating the impact of non-common clock buffer stages in a timing path on clock skew for an integrated circuit. Data (clock skew) shown in data plot 100 may be computed through the use of an analysis methodology, such as statistical static timing analysis (SSTA) or static timing analysis with OCV (STA+OCV). A first curve 105 illustrates clock skew as a function of non-common clock buffer stages computed using SSTA using a particular 45 nanometer fabrication process, and a second curve 110 illustrates clock skew as a function of non-common buffer stages computed using STA+OCV using the same 45 nanometer fabrication process.

Figure 2:
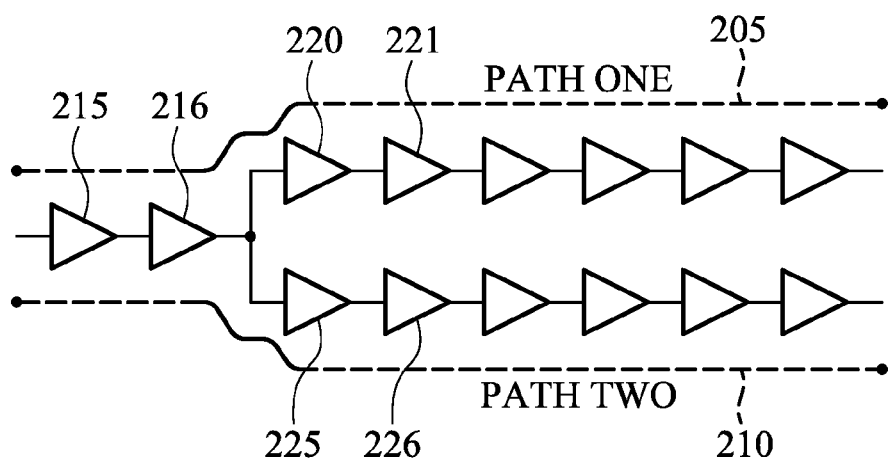
FIG. 2 is a diagram of two timing paths of an integrated circuit.

FIG. 2 is a diagram illustrating two timing paths of an integrated circuit. A first timing path 205 and a second timing path 210 share a number of common clock buffer stages, such as buffer stages 215 and 216. First timing path 205 also includes a number of non-common clock buffer stages, such as buffer stages 220 and 221, which are exclusive to first timing path 205. Similarly, second timing path 210 includes a number of non-common clock buffer stages, such as buffer stages 225 and 226, which are exclusive to second timing path 210.

Turning back now to FIG. 1, since SSTA makes use of a model of the fabrication process used to fabricate the integrated circuit, results computed using SSTA (such as, first curve 105) may provide a good approximation to the actual performance of the integrated circuit. On the other hand, STA+OCV utilizes STA, which generally considers nominal values for the fabrication process used to fabricate the integrated circuit and a fixed timing de-rate factor for each timing path element in timing paths in the integrated circuit to compute clock skew for the integrated circuit. Since STA+OCV uses nominal values and the fixed timing de-rate factor, the computed clock skew (second curve 110) has the appearance of a straight line with a slope that is related to the fixed timing de-rate factor.

As shown in FIG. 1, for small values of non-common buffer stages, STA+OCV (second curve 110) may produce clock skew values that are lower than that produced by SSTA. For small values of non-common buffer stages, integrated circuits designed using STA+OCV may not be as robust as those designed using SSTA since the results produced using STA+OCV may result in a design for the integrated circuit being erroneously determined as meeting design criteria when in actuality, it may have not. This may lead to some integrated circuits not meeting design criteria once fabricated.

For large values of non-common buffer stages, STA+OCV may produce clock skew values that are higher than that produced by SSTA. The higher than expected clock skew values may result in integrated circuits designed using STA+OCV being more pessimistic than those designed using SSTA since the results produced using STA+OCV may be worse than necessary, thereby requiring better performance from the integrated circuit than necessary to meet the design criteria. The increased pessimism in the integrated circuit designed using STA+OCV may result in unnecessary redesign(s) of the integrated circuit.

However, an amount of process variation affecting individual circuitry in an integrated circuit may vary. For example, in a timing path with a plurality of individual timing path elements, the timing of some timing path elements may be late by a maximum positive delay amount expected from the fabrication process, and the timing of some other timing path elements may be early by a maximum negative advance amount expected from the fabrication process, while the timing of other timing path elements may be anywhere in between the two extremes.

Since some timing path elements may be early, some may be late, and others may be in between, the total effect of process variations on the timing of the integrated circuit may partially cancel. This may be especially true in timing paths with a large number of timing path elements. Therefore, OCV timing analysis may be modified to take into consideration the number of timing path elements in a timing path when computing timing of the integrated circuit. This may be referred to as stage-based OCV.

Figure 3:
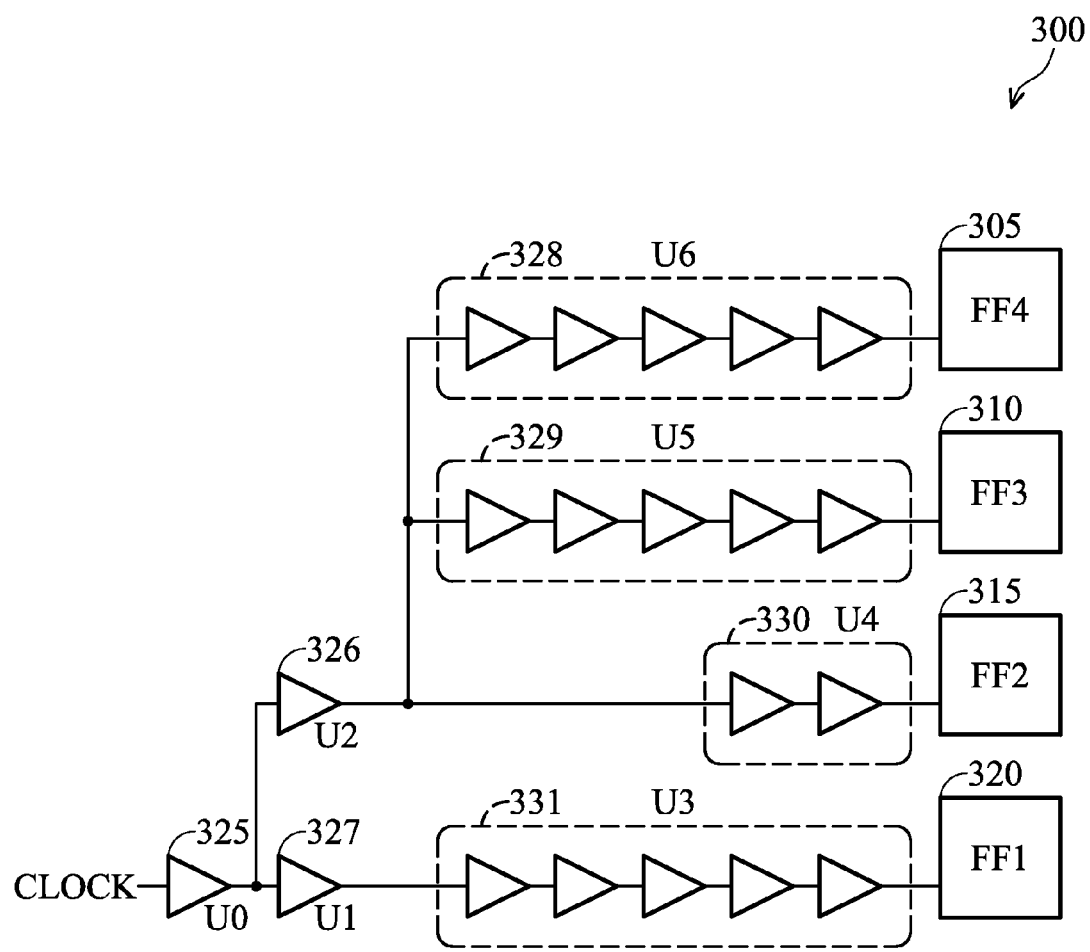
FIG. 3 is a diagram of a clock tree of an integrated circuit.

FIG. 3 is a diagram of a clock tree in an integrated circuit 300. The clock tree includes several flip flops, including FF4 305, FF3 310, FF2 315, and FF1 320. A clock signal may begin at an input to a buffer 325 and then gets distributed to the flip flops over buffers 326 and 327 as well as sequences of buffers 328, 329, 330, and 331. A timing path between the clock signal and a flip flop may include common buffers and non-common buffers. For example, a timing path between the clock signal and FF1 320 and the clock signal and FF2 315 may include common buffer 325 and non-common buffers 326 and 330 (for the timing path between the clock signal and FF2 315) and non-common buffers 327 and 331 (for the timing path between the clock signal and FF1 320).

As discussed previously, only non-common timing elements (buffers) are considered in OCV timing analysis. For example, between FF4 305 and FF3 310, non-common buffers include buffers 328 and 329 for a total of ten (10) buffers, between FF4 305 and FF2 315, non-common buffers include buffers 328 and 330 for a total of seven (7) buffers, and between FF4 305 and FF1 320, non-common buffers include buffers 328, 326, 327, and 331 for a total of 12 buffers.

Figure 4A:
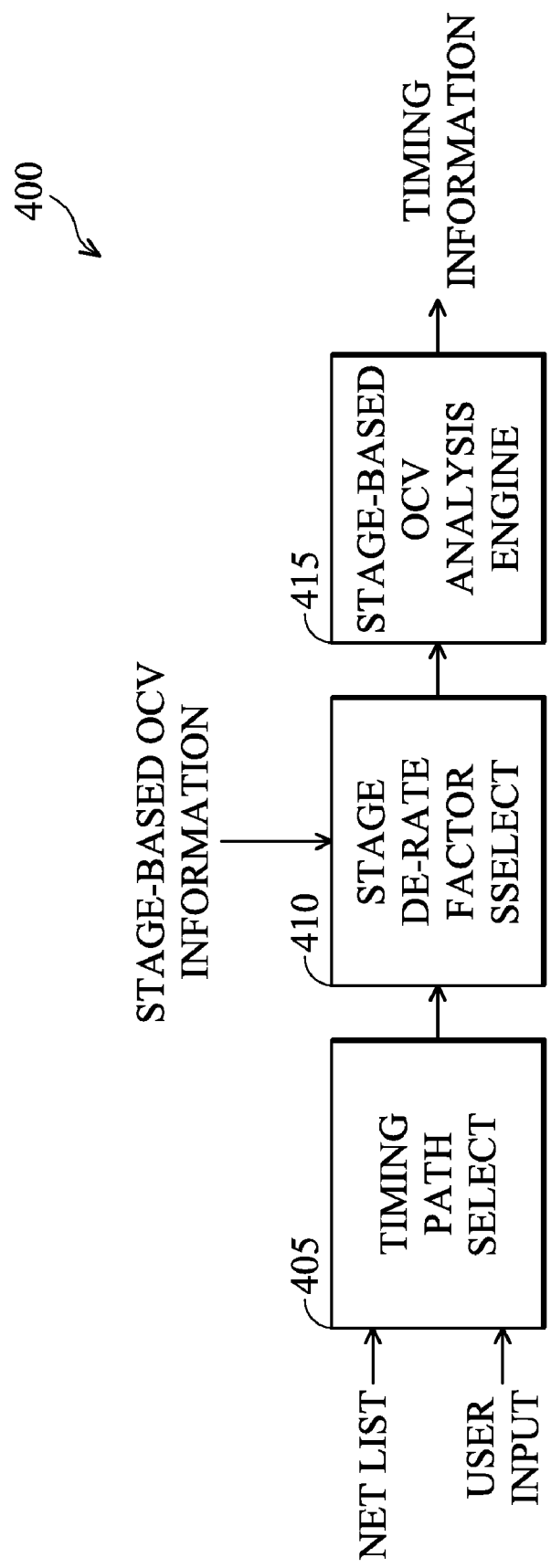
FIG. 4a is a diagram of a stage-based OCV timing analysis system.

FIG. 4a is a diagram illustrating a stage-based OCV timing analysis system 400. Stage-based OCV timing analysis system 400 may be used to perform timing analysis on an integrated circuit design and may provide timing information that may be useful in determining if the integrated circuit design meets design criteria. If the integrated circuit design does not meet design criteria, the timing information may be used to assist in the redesign of the integrated circuit.

Stage-based OCV timing analysis system 400 includes a timing path select unit 405. Timing path select unit 405 may have as an input, a netlist description of the integrated circuit design. The netlist description may specify circuitry in the integrated circuit, how the circuitry is connected, plus information such as fabrication process used, and so forth. Timing path select unit 405 may parse the netlist description of the integrated circuit design to find timing path(s) in the integrated circuit design. Timing path select unit 405 may also have as a second input, user input. User input, in the form of designer input, for example, may help timing path select unit 405 find timing paths, determine common and non-common timing path elements, and so forth.

The timing path(s) found by timing path select unit 405 may then be provided to a stage de-rate factor select unit 410. Stage de-rate factor select unit 410 may assign a timing de-rate factor to the timing path(s) found by timing path select unit 405 based on a count of the number of timing path elements in the timing path(s). If there is more than one timing path in the integrated circuit, each timing path may be assigned a timing de-rate factor. If the timing paths have a different number of timing path elements, then the timing de-rate factors may be different for each timing path. Stage de-rate factor select unit 410 may have as input, stage-based OCV information, which may include a stage-based OCV look-up table. The stage-based OCV look-up table may contain timing de-rate factors for timing paths with differing numbers of timing path elements.

Data in the stage-based OCV look-up table may have been computed using statistical simulation using Monte Carlo simulation techniques for a particular fabrication process to be used in fabricating the integrated circuit. In addition to using Monte Carlo simulation techniques with the statistical simulation, user (for example, designer) input may also be added to modify and adjust the data in the stage-based OCV look-up table.

In general, statistical simulation timing results, such as those arising from Monte Carlo simulation techniques, for example, may include a confidence interval. The confidence interval may be a percentage of integrated circuits out of all integrated circuits that if fabricated using the simulated integrated circuit design and the fabrication process specified by the process model that will meet the timing results. For example, a 90 percent confidence interval may mean that 90 percent of the fabricated integrated circuits will meet or exceed the timing results. Generally, a larger confidence interval (i.e., a higher percentage) may mean a slower timing result. Data in the stage-based OCV look-up table may take into consideration a default or user specified confidence interval.

Once the timing de-rate factors have been assigned to the timing path(s) in the integrated circuit design, a stage-based OCV analysis engine 415 may be used to compute timing information for the integrated circuit design. Stage-based OCV analysis engine 415 may compute timing information for the integrated circuit design by computing different timing values using the timing de-rate factors assigned to the timing path(s) in the integrated circuit, wherein the assigned timing de-rate factors may have been assigned based on the number of timing path elements (for example, non-common buffer stages) present in the timing path(s).

Figure 4B:
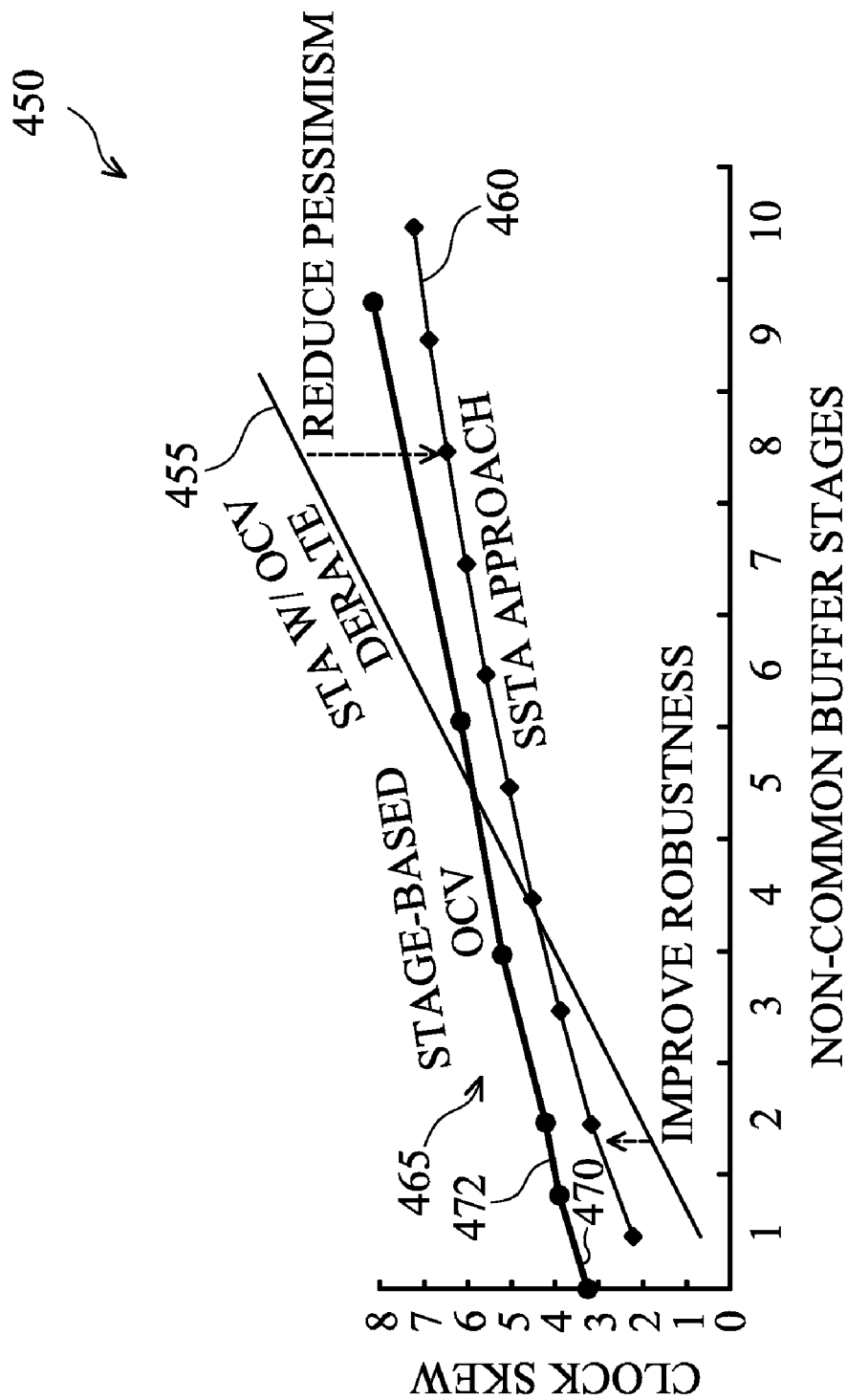
FIG. 4b is a data plot of clock skew versus number of non-common clock buffer stages computed by a number of timing analysis techniques.

FIG. 4b is a data plot 450 illustrating the performance differences in different timing analysis techniques on clock skew arising from non-common clock buffer stages in a timing path of an integrated circuit. A first curve 455 represents data computed using STA+OCV, a second curve 460 represents data computed using SSTA, and a third curve 465 represents data computed using stage-based OCV. As shown in FIG. 4b, for small numbers of non-common buffer stages, the use of stage-based OCV may result in an integrated circuit design with improved robustness (when compared to the results of STA+OCV), while for large numbers of non-common buffer stages, stage-based OCV may produce an integrated circuit with less pessimism than STA+OCV. Third curve 465 may exhibit a piece-wise linear behavior, such as with linear segments 470 and 472, due to different timing de-rate factors used with different numbers of non-common buffer stages.

Figure 5:
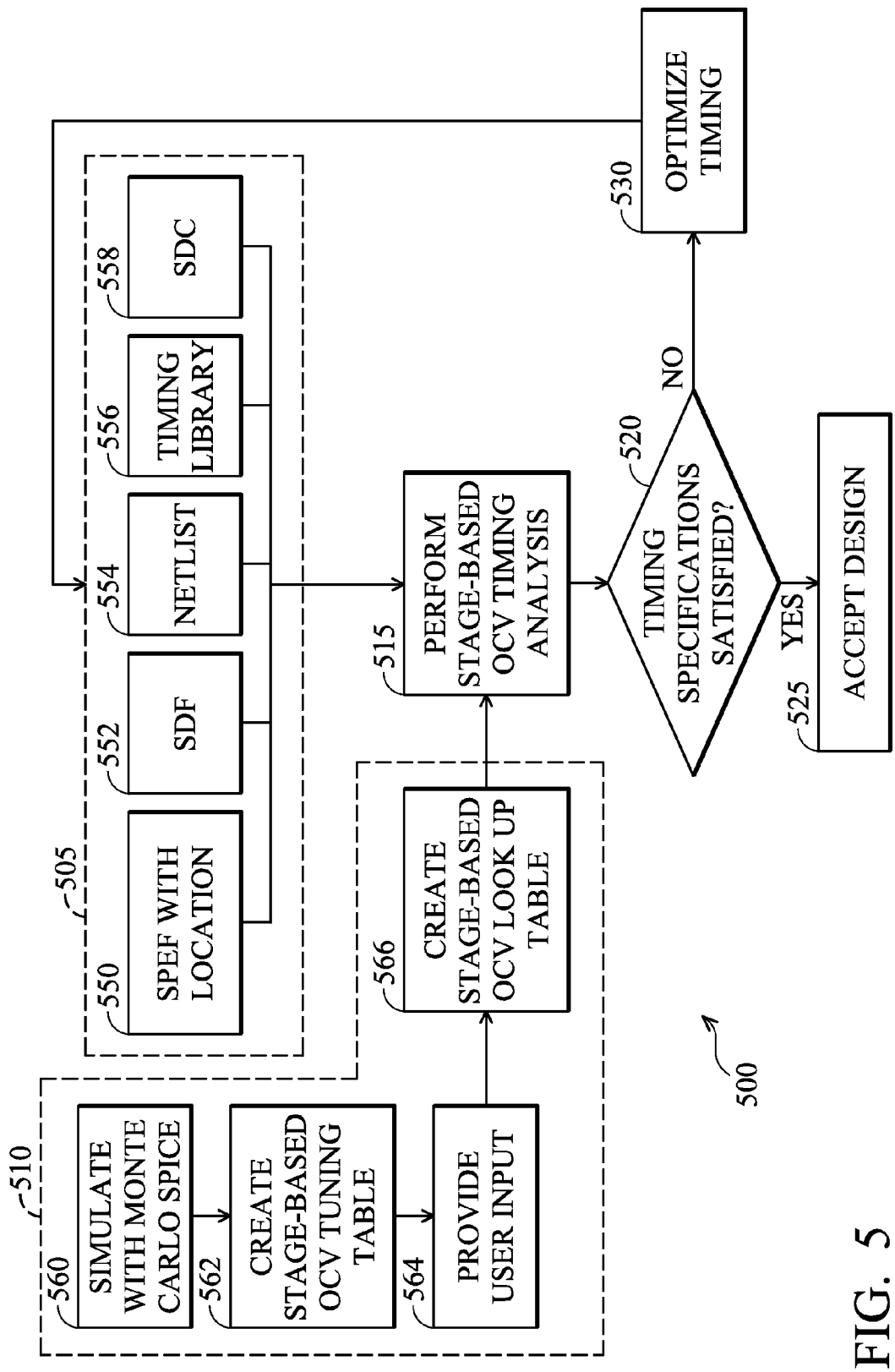
FIG. 5 is a flow diagram of a process for analyzing an integrated circuit design.

FIG. 5 is a flow diagram of a process 500 for analyzing an integrated circuit design using stage-based OCV. Analyzing the integrated circuit design using stage-based OCV may occur after a design for the integrated circuit has been achieved but before fabrication of the integrated circuit takes place. A possible candidate time for analyzing the integrated circuit design using stage-based OCV may be during design place and route (PAR) when circuitry in the integrated circuit may be placed on a virtual substrate and any necessary electrical connections are made. Generally, during PAR, the functional correctness of the integrated circuit design may have already been verified and issues remaining may include chip size, power consumption, performance, and so forth.

Process 500 includes providing the integrated circuit design (block 505) and stage-based OCV data (block 510) to a stage-based OCV timing engine, and performing stage-based OCV timing analysis using the stage-based OCV timing engine (block 515). The stage-based OCV timing engine may produce timing information related to the performance of the integrated circuit design. A check may be performed to determine if the timing information related to the performance of the integrated circuit design meets design criteria (block 520). If the timing information meets design criteria, then the integrated circuit design may be accepted for manufacture once PAR completes and any other required testing is complete (block 525). Since the timing information related to the performance of the integrated circuit design meets design criteria, the integrated circuit design may be accepted without changes (at least due to the timing information).

If the timing information does not meet design criteria, then it may be necessary to optimize the timing of the integrated circuit design (block 530). This may be performed by tweaking the integrated circuit design, changing critical timing paths, and so forth. This may result in changes to the integrated circuit design, which may require that the integrated circuit design be provided once again to the stage-based OCV timing engine (block 505). The design of the integrated circuit may continue to be adjusted until the performance of the integrated circuit meets design criteria or until it is determined that the integrated circuit design may not be capable of meeting design criteria.

Providing the design of the integrated circuit to the stage-based OCV timing engine (block 505) may include providing a variety of information to the stage-based OCV timing engine. Information may include parasitic information including location information in a standard parasitic exchange format (SPEF) (block 550), delay information in a standard delay format (SDF) (block 552), design information in a netlist (block 554), timing library (block 556), design constraints information (SDC) (block 558), and so forth.

In general, stage-based OCV data provided to the stage-based OCV timing engine (block 510) may need to be computed for a specific fabrication process that will be used to fabricate the integrated circuit being designed. However, once computed, the stage-based OCV data may be saved for use with subsequent designs that will be fabricated using the same fabrication process. Therefore, unless adjustments to timing de-rate factors are desired or needed, for example, then as long as the fabrication process remains the same, the stored stage-based OCV data may be reused. This may allow for a library of stage-based OCV data for a wide range of fabrication processes with potentially different timing de-rate factors to be created and stored for later use.

Therefore, if the stage-based OCV data is precomputed and stored in a memory or a library, then providing it to the stage-based OCV timing engine (block 510) may simply involve retrieving the stage-based OCV data from memory/library and providing it to the stage-based OCV timing engine. However, if stage-based OCV data for the fabrication process to be used is not already available or if adjustments are to be made to the stage-based OCV data, then it may be necessary to generate the stage-based OCV data.

Generating stage-based OCV data may begin with performing a statistical simulation of an integrated circuit design, such as a sample circuit or even the integrated circuit design being analyzed (block 560). The statistical simulation may be performed using a statistical simulation software package, such as Spice with Monte Carlo analysis. The statistical simulation makes use of a model of the fabrication process to be used and may include statistical information related to the fabrication process, such as variances in feature sizes, doping variances, optical proximity correction variances, and so forth.

Figure 6B:
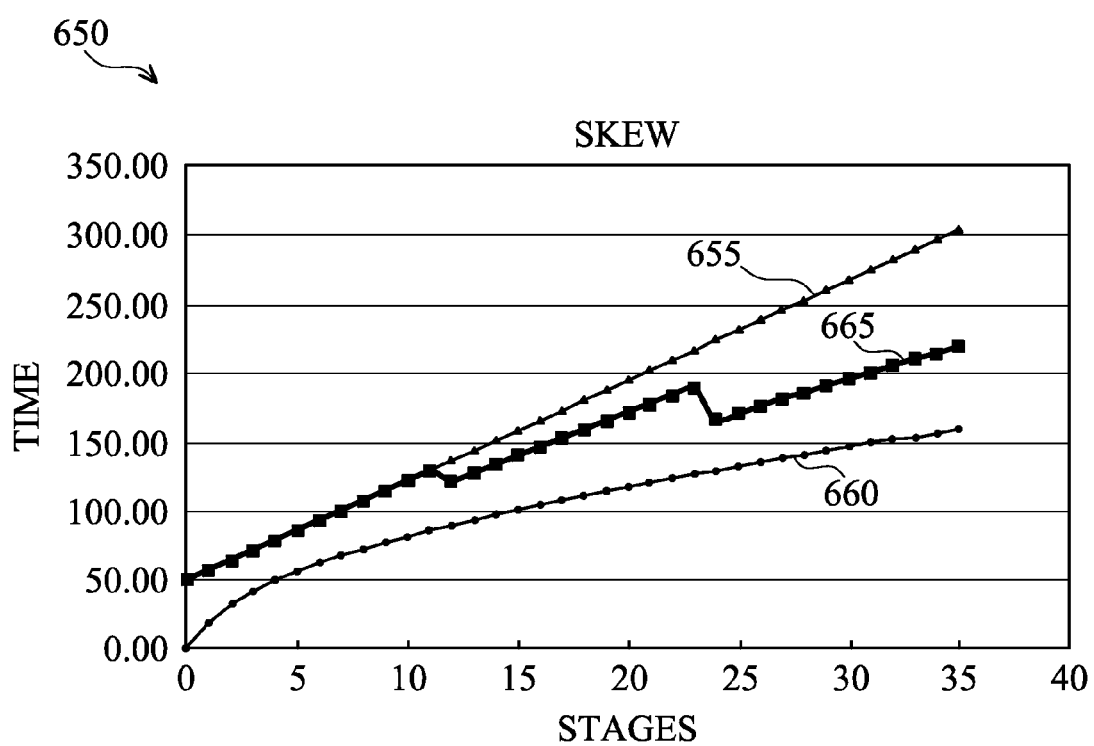
FIG. 6b is a data plot of clock skew versus non-common buffer stages for an integrated circuit design.

The statistical simulation may produce results that may be used to create a stage-based OCV tuning table (block 562). The stage-based OCV tuning table may provide information such as a mean timing delay and a standard deviation (or variance) in the mean timing delay for each value of non-common buffer stages. FIG. 6a is a diagram of a portion of a stage-based OCV tuning table 600. Stage-based OCV tuning table 600 includes entries that may be adjusted by a user (a circuit designer, for example) to help meet desired timing performance requirements. For example, the user may be able to adjust an OCV margin 605 that may be used to set timing de-rate factor, an OCV percentage 610, an N*σ value 615 that may be used to set a confidence interval, a stage-based OCV margin 620 that may be used to set timing de-rate factors for stage-based OCV, a stage-based OCV number 625 that may be used to specify a number of distinct stage-based OCV de-rate factor steps, and so forth. FIG. 6b is a data plot 650 illustrating clock skew versus non-common buffer stages for an integrated circuit design. Shown are a first trace 655 representing timing information computed using STA+OCV timing analysis, a second trace 660 representing timing information computed using SSTA, and a third trace 665 representing timing information computing using stage-based OCV timing analysis using data shown in stage-based OCV tuning table 600. Third trace 665 exhibits a step-like behavior indicating switching between different timing de-rate factors and its impact on clock skew.

Turning back now to FIG. 5, then the user may provide input to tune or adjust the stage-based OCV data contained in the stage-based OCV tuning table (block 564). For example, the stage-based OCV tuning table may enable the user to select a number (N) of standard deviations from a mean timing delay for each value of non-common buffer stages in a timing path to meet a desired confidence interval, a number of distinct stage-based OCV de-rate factor steps, stage-based OCV margin, and so forth. After receiving user input (block 564) if any, a stage-based OCV look-up table may be created (block 566). The stage-based OCV look-up table may be created from information resulting from the statistical simulation (block 560) as well as user input information from the stage-based OCV tuning table (block 564).

Figure 7:
FIG. 7 is a diagram of a stage-based OCV look-up table.

FIG. 7 is a diagram illustrating a stage-based OCV look-up table 700. Stage-based OCV look-up table 700 may be in a tabular format and may include entries including a mean timing value in picoseconds (column 705), a standard deviation (σ) in picoseconds (column 710), an N*σ value that may indicate a span of time that provides sufficient span to meet the specified confidence interval (column 715), a percentage representing a ratio of (N*σ) to the mean timing value (column 720), a stage-based OCV timing de-rate factor (column 725), and a user specified stage-based OCV timing de-rate factor (column 730), for each potential count of non-common buffers in a timing path in the integrated circuit. The user specified stage-based OCV timing de-rate factor (column 730) may preferably be greater than or equal to the stage-based OCV timing de-rate factor to help ensure that the performance criteria are met. As an example, for a timing path with nine (9) non-common buffer stages, a stage-based OCV timing de-rate factor may be 8.64%.

Turning back now to FIG. 5, after the stage-based OCV look-up table has been created (block 566), then the stage-based OCV look-up table may then be stored in memory/library and/or provided to the stage-based OCV timing engine.

Figure 8:
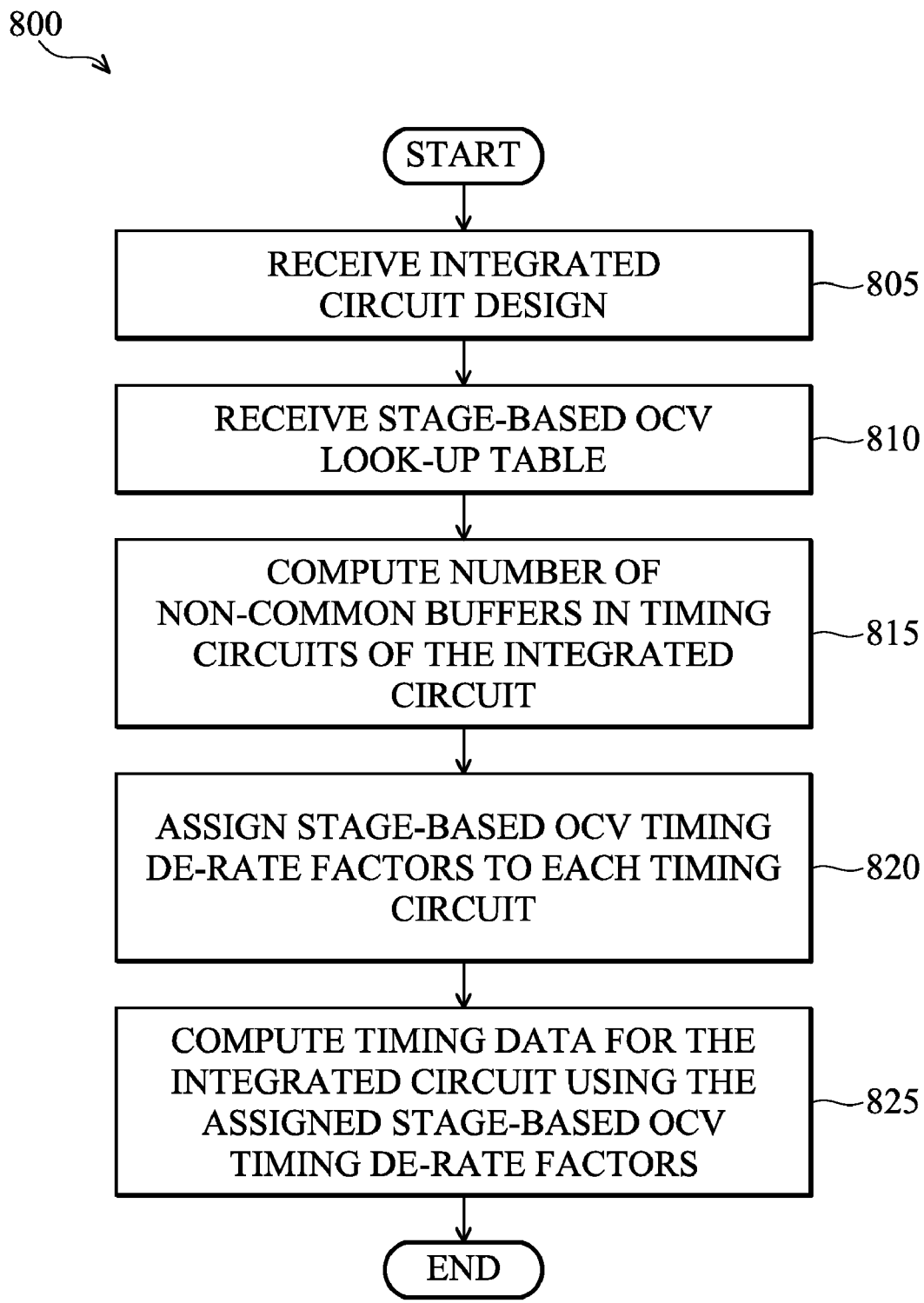
FIG. 8 is a flow diagram of a process for use in computing timing data for an integrated circuit design.

FIG. 8 is a flow diagram 800 for use in computing timing data for an integrated circuit design using stage-based OCV timing analysis. Computing timing data for the integrated circuit design using stage-based OCV timing analysis may begin with receiving the integrated circuit design (block 805). The received integrated circuit design may contain the actual design, parasitic information, delay information, timing information, design constraints, and so forth.

In addition to receiving the integrated circuit design, stage-based OCV data in the form of a stage-based OCV look-up table, for example, may be received (block 810). The stage-based OCV look-up table may contain information such as timing de-rate factors for timing paths of different number of non-common timing path elements (such as, non-common buffers), and so forth.

The integrated circuit design may be parsed to find timing paths and to compute a number of non-common timing path elements in each timing path (block 815). The computed number of non-common timing path elements in each timing path may then be used to assign a stage-based OCV timing de-rate factor to each timing path (block 820). Each timing path in the integrated circuit design may be assigned a different stage-based OCV timing de-rate factor based on the timing path's number of non-common timing path elements.

For discussion purposes let exemplary stage-based OCV timing de-rate factors be as follows, if a timing path has between zero (0) to two (2) non-common timing path elements, then an assigned stage-based OCV timing de-rate factor may be 15%, if a timing path has between two (2) to five (5) non-common timing path elements, then an assigned stage-based OCV timing de-rate factor may be 10%, if a timing path has between five (5) to ten (10) non-common timing path elements, then an assigned stage-based OCV timing de-rate factor may be 5%, and if a timing path has more than ten (10) non-common timing path elements, then an assigned stage-based OCV timing de-rate factor may be 2%. Then referencing FIG. 3, a timing path between FF4 305 and FF3 310 may be de-rated as (timing value of buffer sequence 328)*1.10 and (timing value of buffer sequence 329)*0.90 since the timing path has ten (10) non-common timing path elements. One timing value is de-rated by a maximum value (1.10) while the other timing value is de-rated by the minimum value (0.90) to maximize the impact on the timing. Similarly, a timing path between FF4 305 and FF1 320 may be de-rated as (timing value of buffer sequence 328)*1.05, (timing value of buffer 326)*105, (timing value of buffer sequence 331)*0.95, and (timing value of buffer 327)*0.95 since the timing path has twelve (12) non-common timing path elements.

After assigning stage-based OCV timing de-rate factors to each timing path (block 820), stage-based OCV timing analysis may be used to compute timing data for the integrated circuit (block 825). A stage-based OCV timing engine may be used to perform the stage-based OCV timing analysis. Once the stage-based OCV timing analysis is complete, the computing timing data for an integrated circuit design using stage-based OCV timing analysis may terminate.

The embodiments, as described herein, describe a system and method for performance modeling of integrated circuits that takes into consideration a number of non-common timing path elements in each timing path when assigning a timing de-rate factor to the timing path. The consideration of the number of non-common timing path elements may produce less pessimistic integrated circuit designs when there are large numbers of non-common timing path elements in the timing paths, while producing more robust integrated circuit designs when there are small numbers of non-common timing path elements in the timing paths.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for performing timing analysis on an integrated circuit, the integrated circuit having a timing path, the method comprising:
   computing a number of non-common timing path elements in the timing path;
   assigning a timing de-rate factor to the timing path, wherein the timing de-rate factor is assigned solely based upon the number of non-common timing path elements, wherein the assigning the timing de-rate factor is performed with a stage de-rate factor select unit;
   computing a timing analysis on the integrated circuit using the assigned timing de-rate factor; and
   storing the computed timing analysis.

2. The method of claim 1, further comprising prior to the computing a number of non-common timing path elements:
   receiving a design of the integrated circuit; and
   receiving a set of timing de-rate factors.

3. The method of claim 1, wherein the integrated circuit has a plurality of timing paths, and wherein the computing a number of non-common timing path elements comprises computing a number of non-common timing path elements for each timing path in the plurality of timing paths.

4. The method of claim 3, wherein the assigning comprises assigning a timing de-rate factor to each timing path in the plurality of timing paths, wherein each assigning is based on a number of non-common timing path elements in the timing path being assigned the timing de-rate factor.

5. The method of claim 1, wherein the computing a timing analysis comprises performing a stage-based on-chip variation (OCV) timing analysis.

6. A method for approving an integrated circuit for fabrication, wherein the integrated circuit has at least one timing path, the method comprising:
   receiving a design for the integrated circuit;
   computing performance data for the integrated circuit by performing a timing analysis of each timing path in the integrated circuit, wherein each timing path in the integrated circuit is de-rated by a stage-based on-chip variation analysis engine, wherein the derating is performed with a derating factor that has been assigned to a particular number of non-common timing path elements in the timing path; and
   accepting the design in response to determining that the performance data meets performance requirements.

7. The method of claim 6, further comprising adjusting the design in response to determining that the performance data does not meet performance requirements.

8. The method of claim 6, wherein the computing performance data comprises:
   computing a number of non-common timing path elements for each timing path;
   assigning a timing de-rate factor for each timing path based on the timing path's computed number of non-common timing path elements; and computing a timing analysis on the design using the assigned timing de-rate factors.

9. The method of claim 8, further comprising prior to the computing a number of non-common timing path elements, receiving a set of timing de-rate factors.

10. The method of claim 9, wherein the receiving a set of timing de-rate factors comprises retrieving the set from storage.

11. The method of claim 9, wherein the receiving a set of timing de-rate factors comprises:
performing a statistical simulation of a circuit design; and
creating the set of timing de-rate factors based on the simulation results.

12. The method of claim 11, further comprising prior to the creating, tuning the simulation results.

13. The method of claim 12, wherein tuning the simulation results comprises specifying a number of standard deviations of a computed mean to span a confidence interval.

14. The method of claim 12, wherein tuning the simulation results comprises specifying a margin more pessimistic than a default margin used to create the set of timing de rate factors.

15. The method of claim 11, wherein the performing a statistical simulation utilizes a model of a fabrication process used to fabricate the integrated circuit.

16. The method of claim 11, wherein the statistical simulation makes use of Monte Carlo simulation techniques.

17. The method of claim 6, wherein receiving a design for the integrated circuit comprises receiving parasitic information, delay information, a netlist, timing information, and constraint information, for the integrated circuit.

18. A system for performing timing analysis on a design of an integrated circuit, the system comprising:
a timing path select unit configured to select timing paths in the design;
a stage de-rate factor select unit coupled to the timing path select unit, the stage de-rate factor select unit configured to assign a timing de-rate factor to each timing path selected by the timing path select unit, wherein a timing de-rate factor assigned to a timing path is associated with a number of non-common timing path elements in the timing path; and
a stage-based on-chip variation (OCV) analysis engine coupled to the stage de-rate factor select unit, the stage-based OCV analysis engine configured to compute timing information for the design from the timing de-rate factors assigned to each timing path in the design.

19. The system of claim 18, wherein the stage de-rate factor select unit is configured to receive a set of timing de-rate factors to assign to each timing path.

20. The system of claim 19, wherein the set of timing de-rate factors is derived from a statistical simulation of a fabrication process used to fabricate the integrated circuit.

* * * * *